United States Patent [19]
Sato et al.

[11] 3,752,562  
[45] Aug. 14, 1973

[54] OPTICAL SCALE READING DEVICE IN MEASURING INSTRUMENT

[75] Inventors: Masao Sato, Yokohama; Hideaki Iwaida, Kawasaki-shi, both of Japan

[73] Assignee: Nippon Kogaku K.K., Tokyo, Japan

[22] Filed: Apr. 10, 1972

[21] Appl. No.: 242,524

[30] Foreign Application Priority Data  
Apr. 9, 1971 Japan.................................. 46/26156

[52] U.S. Cl................................. 350/113, 356/139  
[51] Int. Cl. ........................................ G02b 27/32  
[58] Field of Search....................350/110–116; 353/41; 356/139, 170

[56] References Cited  
UNITED STATES PATENTS  
3,053,143 9/1962 Meier.............................. 350/114 X Primary Examiner—John K. Corbin  
Attorney—Joseph M. Fitzpatrick, John Thomas Cella et al.

[57] ABSTRACT

An optical scale reading device employed in distance measuring device or in angle measuring device is disclosed, in which extra portions not to be read are darkened so that necessary reading can be attained quickly and without fail.

1 Claim, 5 Drawing Figures

PATENTED AUG 14 1973          3,752,562
FIG. 1     PRIOR ART
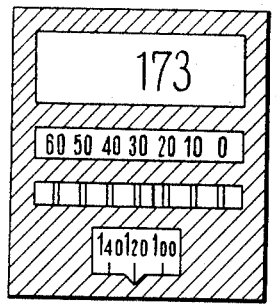
FIG. 2
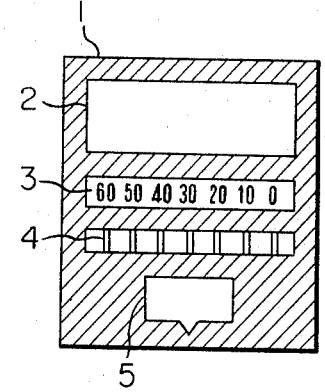
FIG. 3
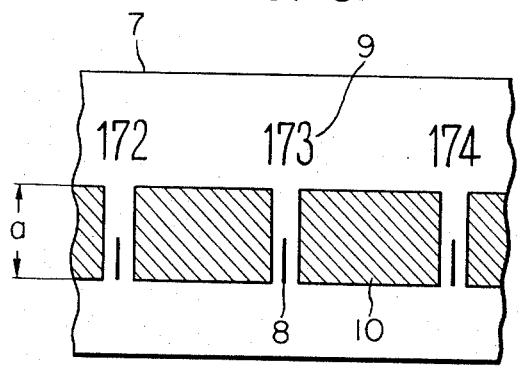
FIG. 4        FIG. 5
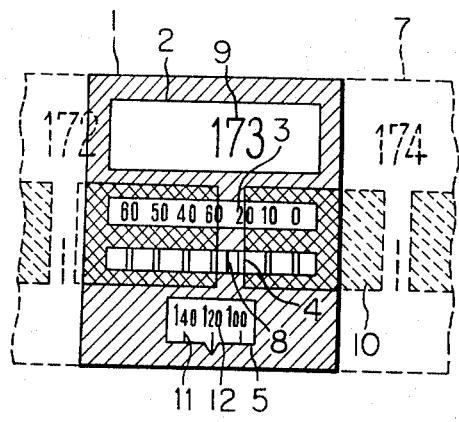 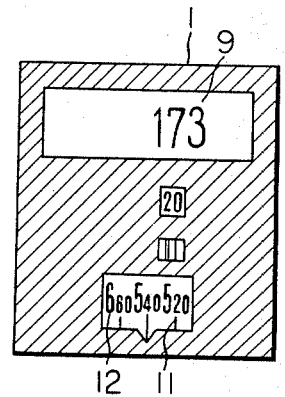

OPTICAL SCALE READING DEVICE IN MEASURING INSTRUMENT

BACKGROUND OF THE INVENTION

1. Field of the Invention

This invention relates to optical measuring instrument and particularly to optical scale reading device in optical distance measuring device or optical angle measuring device such as theodolite.

2. Description of the Prior Art

In the conventional optical scale, reading device, the field of view of focussing mirror is considerably large and contains more area than that to be read. Therefore, there is a drawback in the conventional device that the scale is difficulat to be quickly read.

SUMMARY OF THE INVENTION

It is a first object of the present invention to eliminate such drawback of the conventional art.

It is a further object of the present invention to provide an optical scale reading device with which one can read the scale quickly at a glance.

According to the present invention, there is provided an optical scale reading device, in which opaque areas having a width which can cover the subdivision lines and numerals of the auxiliary scale, are provided between each two main scale lines, and a length between each main scale line and an edge of the opaque area nearest thereto is substantially the same as or shorter than half length between adjacent two auxiliary scale lines, whereby unnecessary portion in the focussing mirror, which is not to be read, becomes dark so that the graduations of the main and auxiliary scales can be quickly read.

BRIEF DESCRIPTION OF THE DRAWINGS

FIG. 1 is a view of field in the conventional optical scale reading device;

FIG. 2 is a front view of a focussing mirror in an embodiment of the present invention;

FIG. 3 is a part representing a main scale plate of the embodiment according to the present invention;

FIG. 4 is a view illustrating a positional relation in case when the main scale is imaged on the focussing mirror;

FIG. 5 is a view of field in the focussing mirror of the optical scale reading device according to the present invention.

DESCRIPTION OF THE PREFERRED EMBODIMENTS

In the conventional optical scale reading device, an extra portion not to be read is seen in the field of view, as shown in FIG. 1.

Referring to FIGS. 2 to 5, there is illustrated an optical scale reading device provided in an angle meter, embodying the present invention, in which a focussing mirror is designated as 1. On a mask 2 of the focussing mirror 1 is focussed numerals or characters 9, which are graduated on a main scale 7 (FIG. 3), each numeral corresponding to degrees of an angle to be measured. An auxiliary scale numerals 3 are provided to show 10 minutes per each subdivision. Under each of the auxiliary scale numerals 3, there are provided two parallel lines or one pair of auxiliary scale lines 4. A main scale line 8 of the main scale 7 is focussed on the auxiliary scale line portion 4. On a mask 5 there are formed an image of numerals 12 on a micro-scale and of microscale lines 11.

Hatching 6 shows opaque portion. On the main scale plate 7 there is provided opaque areas between each two main scale lines 8. Each opaque area is of a width $a$ which is sufficient to cover the numerals 3 and the lines 4 of the auxiliary scale. A distance between the main scale line 8 and an edge of the opaque area nearest thereto is made substantially equal or shorter than half length between neighboring two pairs of the auxiliary scale lines 4.

FIG. 4 shows the positional relation in case when a portion of the main scale plate 7 is focussed on the focussing mirror 1. In this case, the numeral 173 (corresponding to 173 degrees) of the main scale 9 is displayed, and the main scale line 8 corresponding thereto is focussed in an intermediate position between two pairs of the parallel lines 4 for the auxiliary scale. These pairs of the auxiliary scale correspond to 20 minutes and 30 minutes, respectively. For reading the fractional part pointed by the main scale line 8, the micro-scale 12 is rotated to thereby shift the line 8 which is associated with the numerals of the micro-scale 12 by a mechanism. (The mechanism is not shown because such mechanism is not directly related to the present invention.) The main scale line 8 is led to the central position of the parallel lines 4 which correspond to 20 minutes of the auxiliary scale 3, as shown in FIG. 5. Thus, a required value 173° 25' 40'' can be read.

While there have been described and illustrated preferred embodiment which is directed to angle meter, it is apparent that the present invention is suitably applied to distance or linear measuring meter.

We claim:

1. In an optical scale reading device comprising
   a main scale plate having the main scale lines and the main scale numerals, and
   a focussing mirror being formed with the auxiliary scale lines, the auxiliary scale numerals and masks, and being opaque without portions defined by said auxiliary scale lines, numerals and masks, thereby said main scale lines being focussed on a portion formed with said auxiliary scale lines,
   the improvement comprises that opaque areas each having a width covering said auxiliary scale lines and numerals, are formed between each two main scale lines, and a length between each main scale line and one end of the opaque area nearest thereto is at the maximum as large as half length between adjacent auxiliary scale lines.

* * * * *